(12) United States Patent
Storm et al.

(10) Patent No.: US 7,913,588 B2
(45) Date of Patent: Mar. 29, 2011

(54) INSULATION STRIPPING TOOL WITH STRIKER MEANS

(75) Inventors: Siegfried Storm, Schlangen (DE); Christian Heggemann, Detmold (DE); Detlev Hetland, Detmold (DE); Guenter Hanning, Detmold (DE); Thomas Koester, Schlangen (DE); Andreas Wedler, Detmold (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 13 days.

(21) Appl. No.: 12/290,479

(22) Filed: Oct. 31, 2008

(65) Prior Publication Data

US 2009/0126534 A1 May 21, 2009

(30) Foreign Application Priority Data

Nov. 2, 2007 (DE) .................... 20 2007 015 347 U

(51) Int. Cl.
*H02G 1/12* (2006.01)
(52) U.S. Cl. ........................................................ 81/9.41
(58) Field of Classification Search ............... 081/9.4, 081/9.41–9.44; 090/90.1, 91.1, 91.2; 030/90.1, 030/91.1, 91.2
See application file for complete search history.

(56) References Cited

U.S. PATENT DOCUMENTS

| 4,407,174 | A | * | 10/1983 | Schulze | .......................... | 81/9.42 |
| 5,331,867 | A | * | 7/1994 | Carpenter et al. | .............. | 81/9.41 |
| 5,572,911 | A | | 11/1996 | Schmode | | |
| 5,724,870 | A | * | 3/1998 | Wiebe et al. | ................... | 81/9.43 |
| 6,079,296 | A | * | 6/2000 | Muromoto | ..................... | 81/9.43 |
| 6,895,836 | B2 | | 5/2005 | Hetlund | | |
| 6,910,401 | B2 | * | 6/2005 | Tapper | ........................... | 81/9.43 |

FOREIGN PATENT DOCUMENTS

| DE | 8015173 U1 | 9/1980 |
| DE | 264793 A1 | 2/1989 |
| DE | 195 12 132 C1 | 5/1996 |
| DE | 19512132 C1 | 5/1996 |
| EP | 0007699 A1 | 2/1980 |
| EP | 0791993 A | 8/1997 |

* cited by examiner

*Primary Examiner* — Hadi Shakeri
(74) *Attorney, Agent, or Firm* — Lawrence E. Laubscher, Sr.; Lawrence E. Laubscher, Jr.

(57) ABSTRACT

An insulation stripping tool of the pliers-type includes an adjustable pull rod stop device for limiting the extent of travel of the longitudinally displaceable pull rod and the cutting and stripping blades connected thereto, thereby to produce only partial removal of a length of severed insulation layer from an insulated conductor. An adjustable conductor stop device is mounted on at least one of the cutting and stripping blade holders for limiting the extent to which the end of the insulated conductor is inserted into the open mouth of the stripping tool. A stationary scale is mounted on one of the handles adjacent the adjustable conductor stop device.

7 Claims, 20 Drawing Sheets

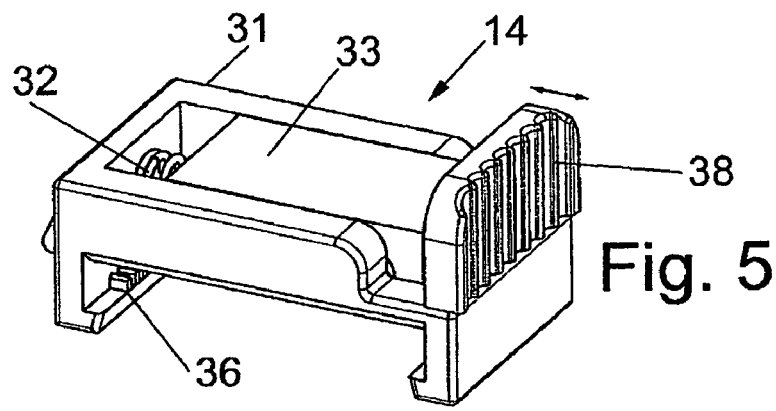
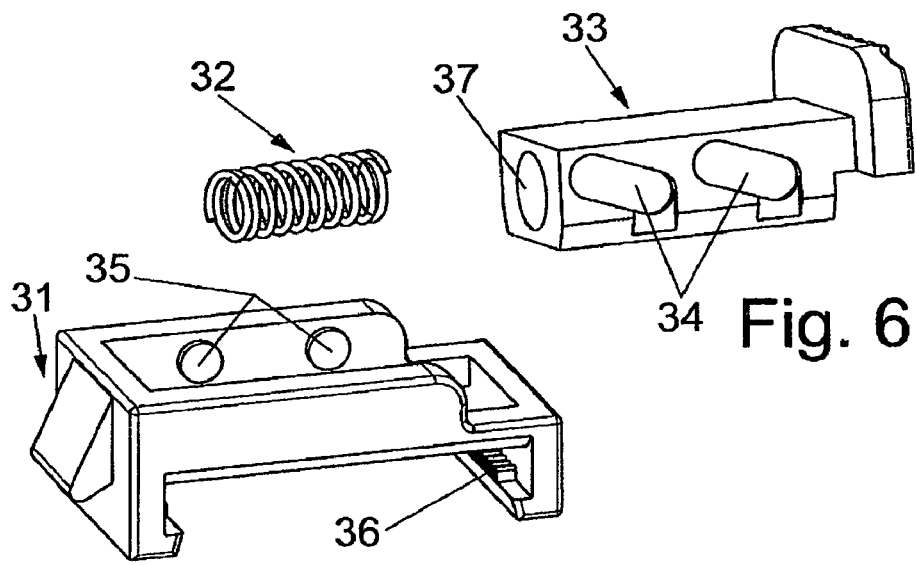
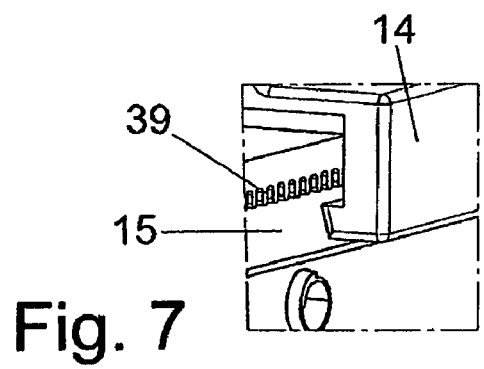

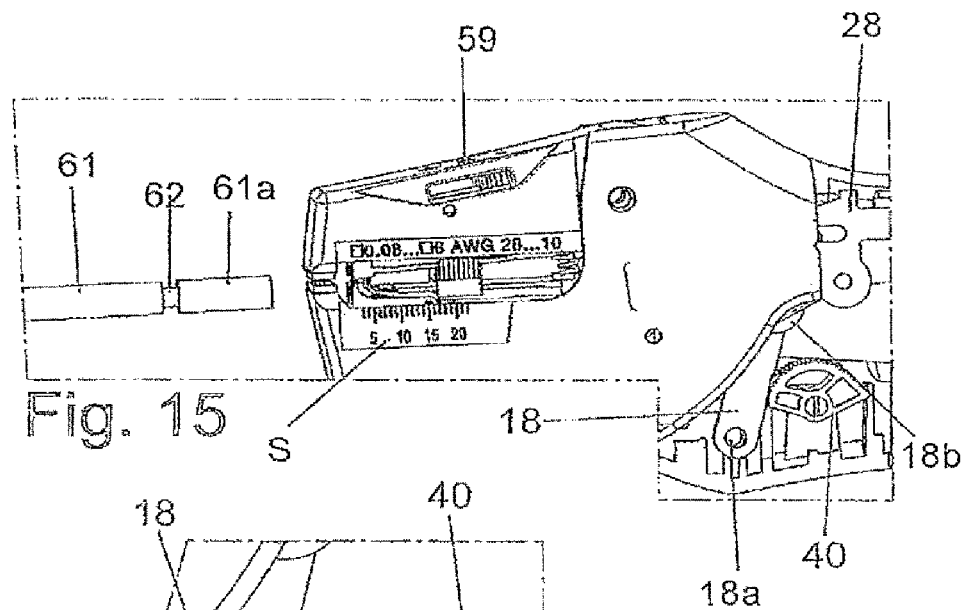
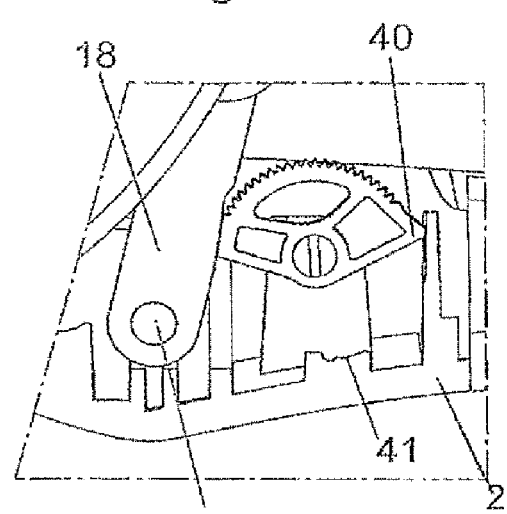
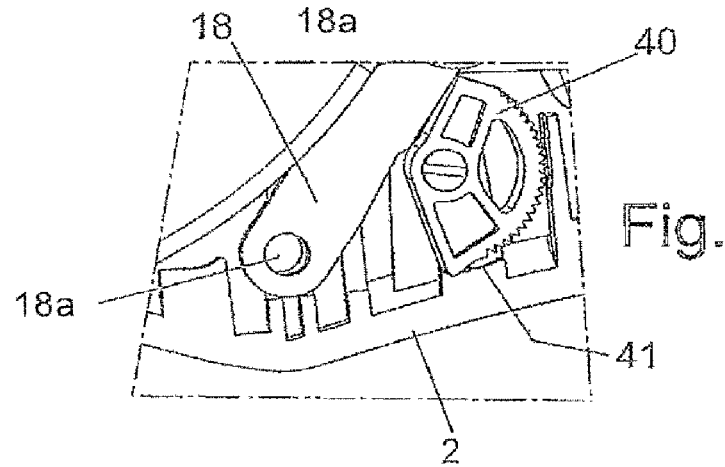

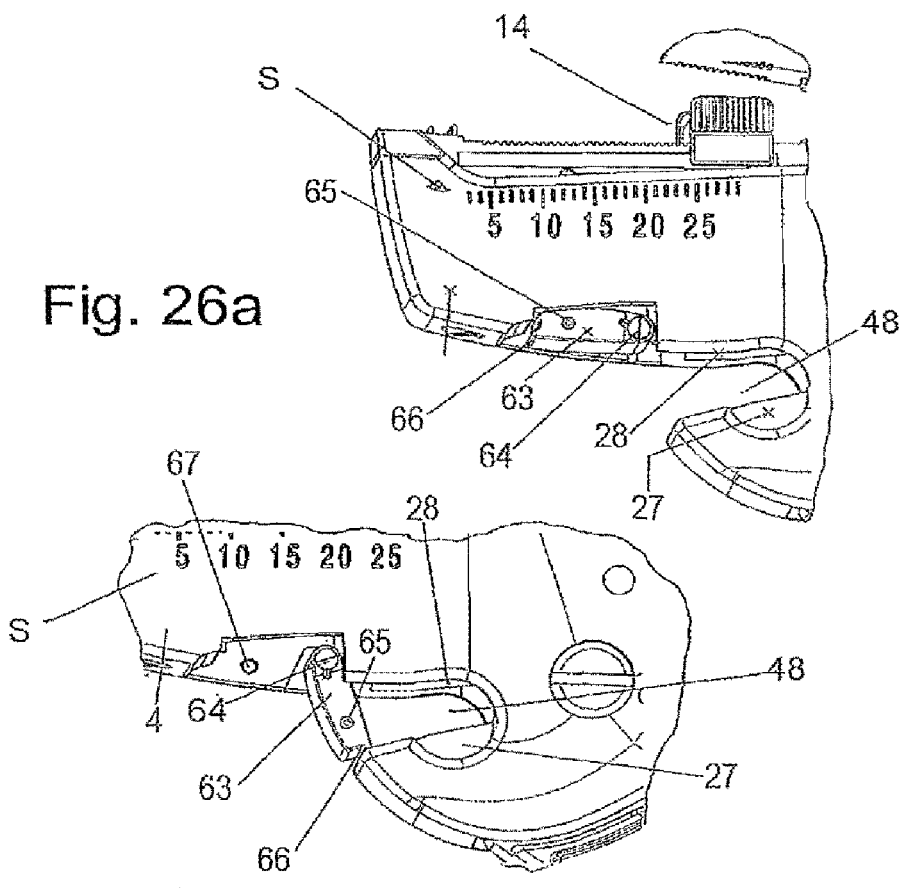
Fig. 26a
Fig. 26b
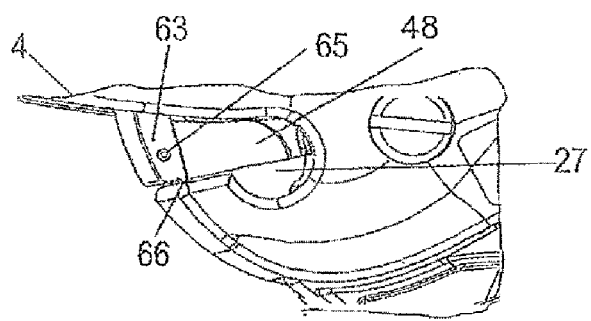
Fig. 26c

INSULATION STRIPPING TOOL WITH STRIKER MEANS

REFERENCE TO RELATED APPLICATIONS

This application is related to the co-pending applications filed by the same inventors on the inventions entitled "Insulation Stripping Tool With Displaceable Knife Carrier Means", Ser. No. 12/290,558 filed Oct. 31, 2008, and "Hand Grip Shell for Pliers-Type tools", Ser. No. 12/290,557 filed Oct. 31, 2008.

BACKGROUND OF THE INVENTION

1. Field of the Invention

An insulation stripping tool of the pliers-type includes an adjustable pull rod stop or striker device for limiting the extent of travel of the longitudinally displaceable pull rod and the cutting and stripping blades connected thereto, thereby to produce only partial removal of a length of severed insulation layer from an insulated conductor. An adjustable conductor stop device is mounted on at least one of the cutting and stripping blade holders for limiting the extent to which the end of the insulated conductor is inserted into the open mouth of the stripping tool. A stationary scale is mounted on one of the handles adjacent the adjustable conductor stop device.

2. Description of Related Art

A insulation stripping pliers are well known in the prior art, as shown by the German patent No. DE 195 12 132 C1 (U.S. Pat. No. 5,724,870). The design shown and described there has worked very well in practice. The stripping pliers is configured so that a pull rod can move in the lengthwise direction of the pliers mouth and two stripping elements are fastened to this in order to move along with it and thereby pull the layer of insulation off from a cable. On one of the stripping elements is placed a cable stop, which can move along the stripping element. The drawback to this type of stripping pliers is that the placement of the cable stop does not allow for a precise adjustment, and also the mounting of the cable stop on the stripping element by being pushed onto it is in need of improvement. A partial stripping of the severed insulation layer from the conductor is not possible in this stripping tool.

The U.S. Pat. No. 6,910,401 discloses a stripping pliers with a cutting unit that contains two pivot-mounted arms spring-loaded against each other and having cutting elements at their two ends, while the cutting unit is accommodated between clamping claws and moves along with them. Connected to this cutting unit is a pull rod and a clamping and pulling mechanism. On the lower arm, a movable single-piece cable stop is fastened. The fastening of the cable stop to the arm is by a locking tongue, which engages with a toothed groove at the side walls of the arm. With this type of fastening, there is a danger that the cable stop will get stuck or be hard to move. Again, partial stripping of the severed insulation length is not possible here.

The present invention was developed to provide a stripping pliers that is suitable for the partial stripping of cables with the most diverse thicknesses of insulation layers. Another object is to develop an improved cable stop for the stripping pliers.

SUMMARY OF THE INVENTION

Accordingly, a primary object of the invention is to provide an insulation stripping tool of the pliers-type including an adjustable pull rod stop or striker device for limiting the extent of travel of the longitudinally displaceable pull rod and the cutting and stripping blades connected thereto, thereby to produce only partial removal of a length of severed insulation layer from an insulated conductor.

A further object of the invention is to provide adjustable conductor stop means mounted on at least one of the cutting and stripping blade holders for limiting the extent to which the end of the insulated conductor is inserted into the open mouth of the stripping tool. A stationary scale is mounted on one of the handles adjacent the adjustable conductor stop device.

The stripping pliers of the invention enables an easy partial stripping of a conductor cable.

The partial stripping stop of the invention is easy to operate, economical to make, and easy to integrate in the stripping pliers. Thanks to the configuration of the partial stripping stop as an L-piece, it is easy to make and enables an easy partial stripping process. The configuration of an adjusting cam enables an even more precise adjustment for the partial stripping of the insulated conductor or cable.

The two-piece form of the conductor stop means enables a precise and easily operated mechanism.

BRIEF DESCRIPTION OF THE DRAWINGS

Other objects and advantages of the invention will become apparent from a study of the following specification, when viewed in the light of the accompanying drawing, in which:

FIG. 5 is a perspective view of the conductor stop means;

FIG. 6 is an exploded perspective view of the conductor stop means of FIG. 5, and FIG. 7 is a detailed view illustrating the locking means for setting the position of the conductor stop means;

FIG. 15 is a perspective detail view of another embodiment of the stripping pliers partial stripping stop means, and FIGS. 16 and 17 are detailed views of the stop means when in the partial-stripping and full-stripping positions, respectively;

FIGS. 26a-26c are detailed perspective views of the conductor severing means mounted on one of the handle members;

DETAILED DESCRIPTION OF THE INVENTION

Figure 20:
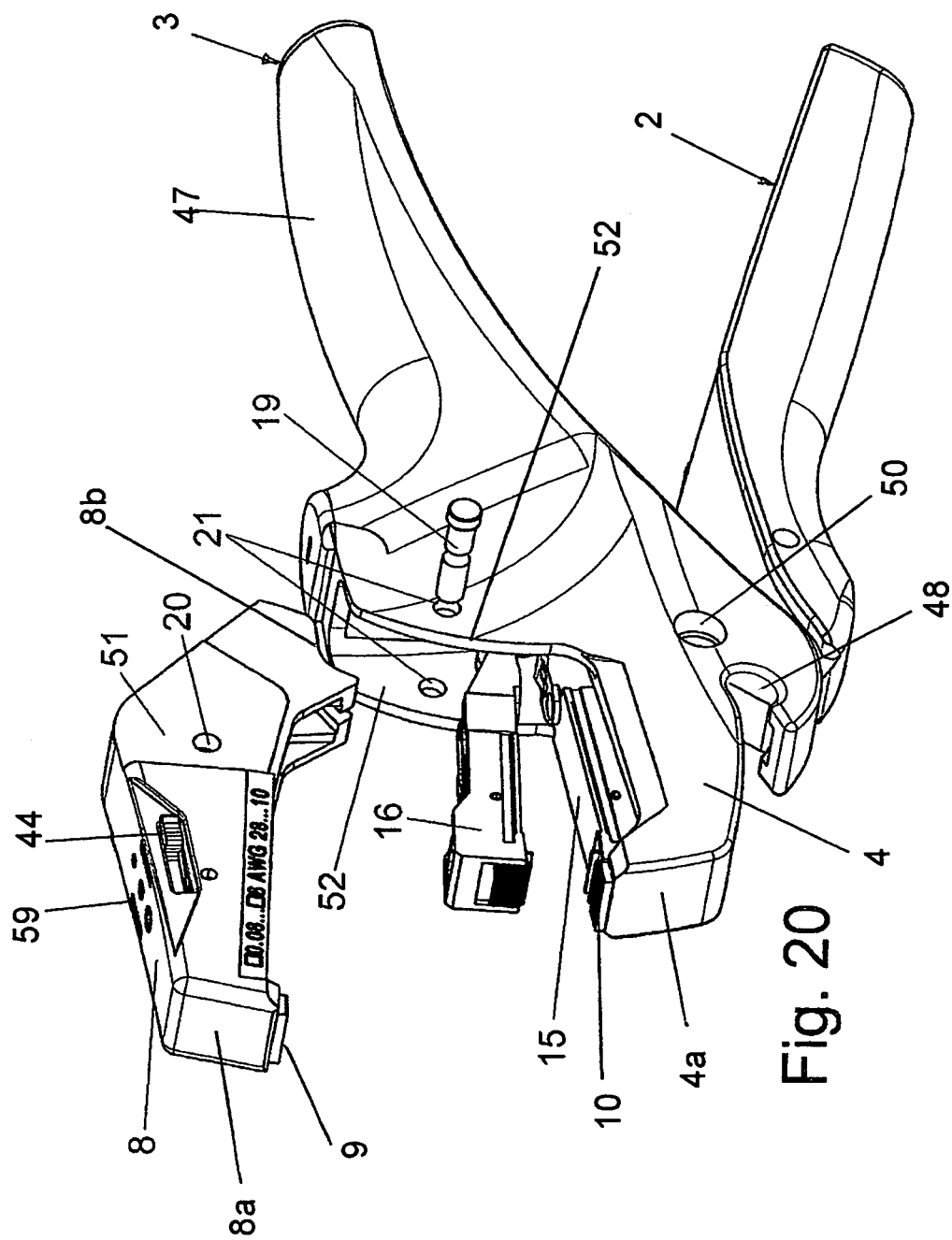
FIG. 20 is a perspective front view of a preferred embodiment of the stripping pliers when in a partially disassembled condition for the removal of the blade holders.
Figure 21:
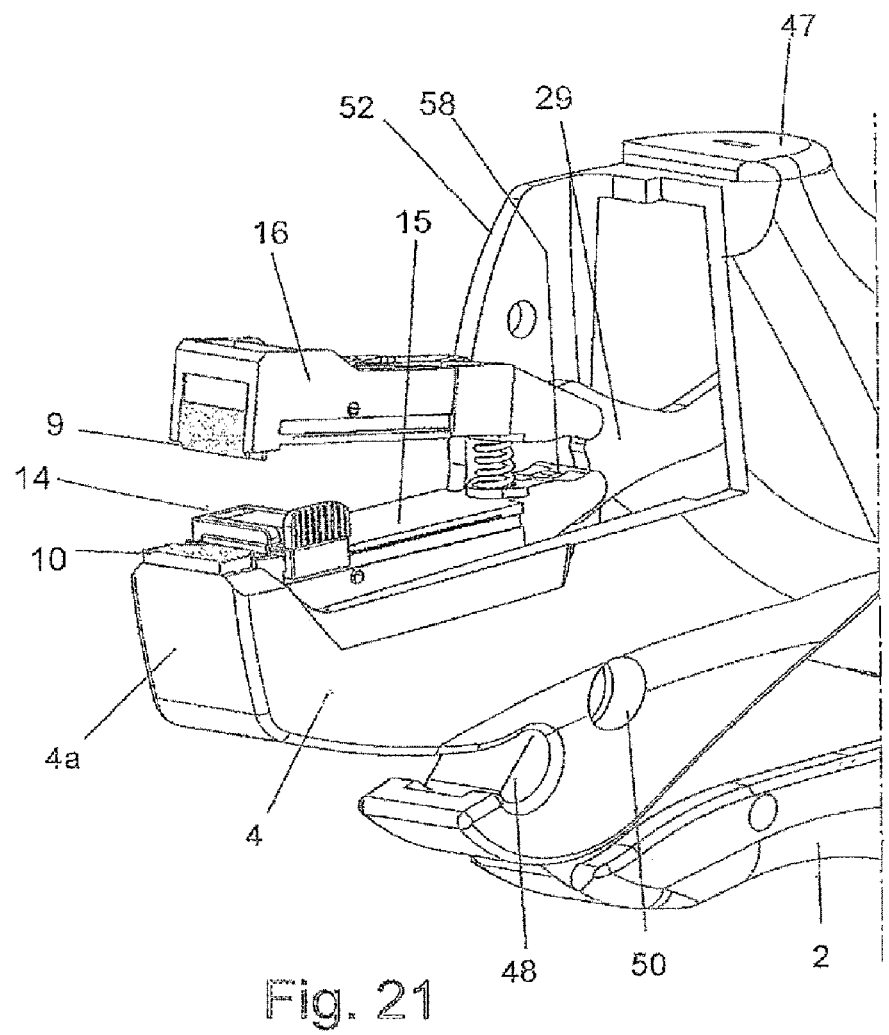
FIGS. 21-23 are perspective views illustrating the steps for the removal of the blade holders.
Figure 22:
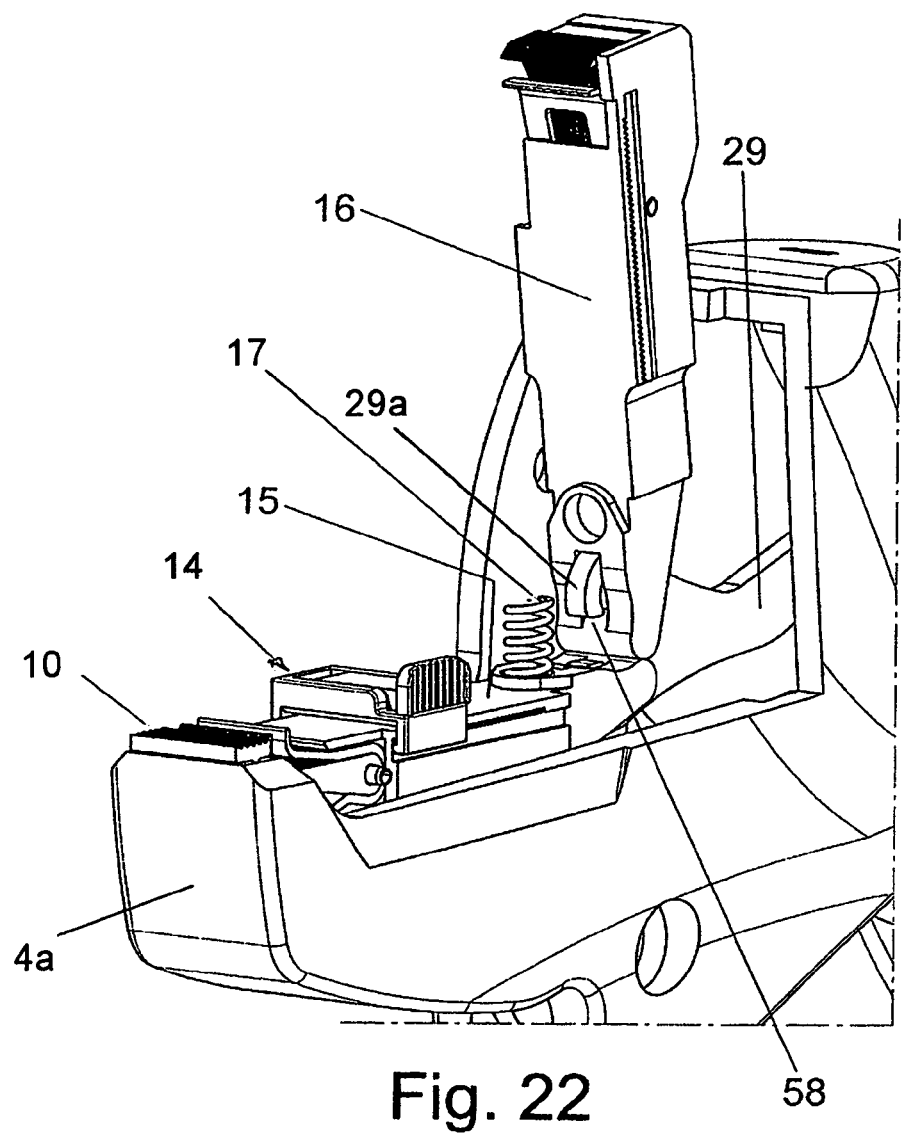
Figure 23:
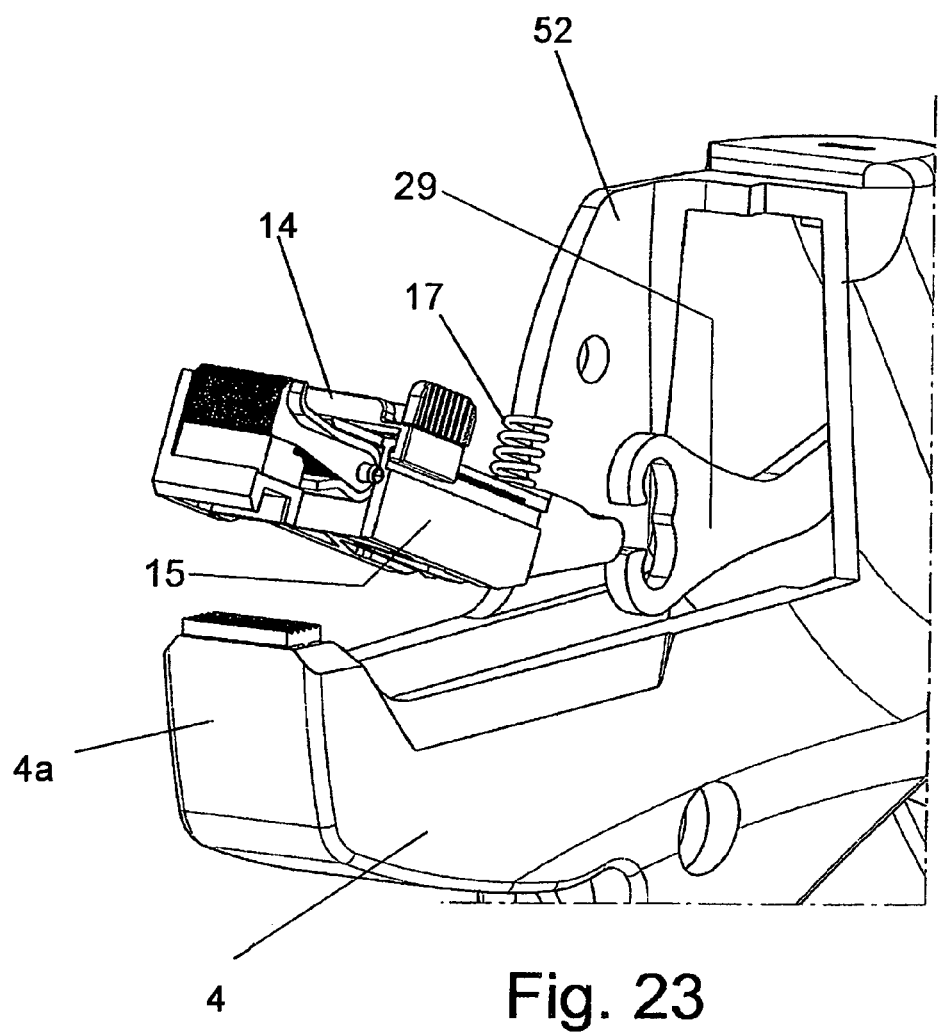
Figure 24:
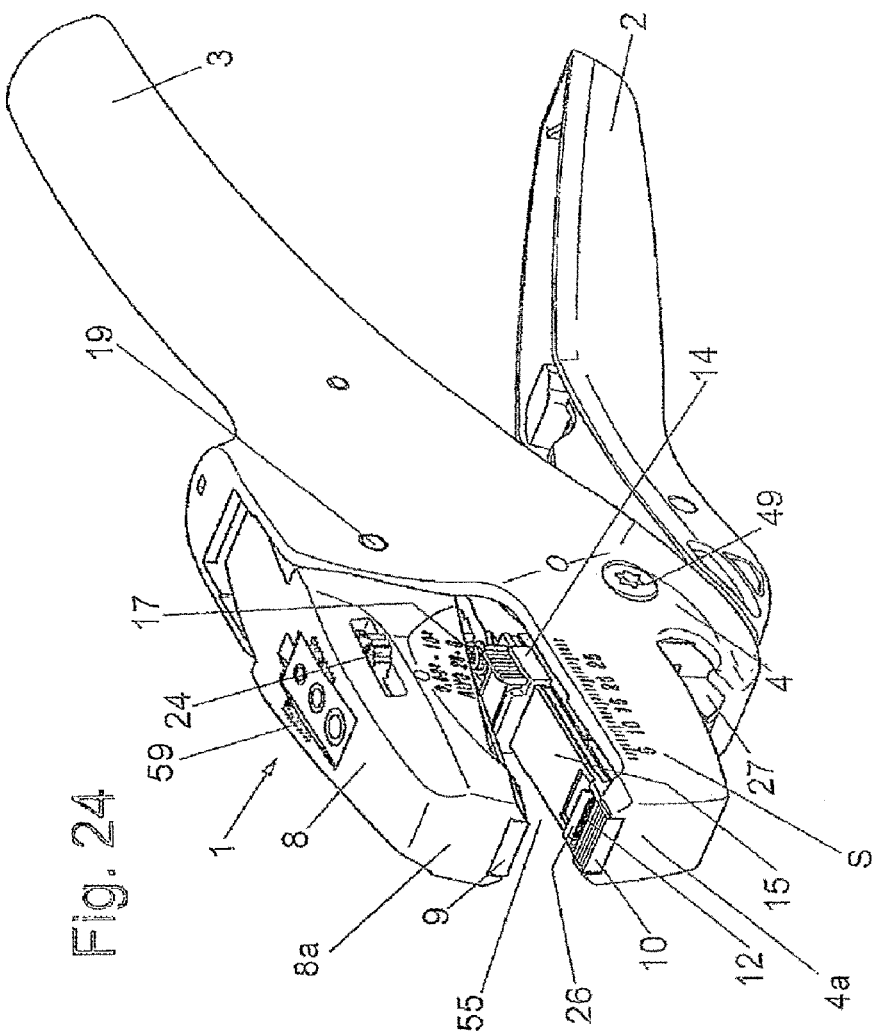
FIG. 24 is a perspective detail view of one embodiment of the stripping pliers in the fully assembled state.

For an initial overview of the pliers-type insulation stripping tool 1 of the present invention, reference is first made to FIGS. 20 and 24, wherein a pair of handle members 2 and 3 are pivotally connected for pivotal movement between open and closed positions about a pivot axis 49. At one end, the handle member 3 includes a shell portion 4 having a transverse end wall 4a and a pair of parallel spaced side walls 52 that define therebetween a chamber in which are arranged a pair of pivotally connected blade holders 15 and 16.

A clamping jaw 8 is pivotally connected with the shell 4 by means of a removable pivot pin 19 that extends through opposed openings 21 contained in the shell side walls. The clamping jaw 8 is provided at its free end with a durable clamping insert 9 arranged opposite a corresponding clamping insert 10 carried by the shell end wall 4a. The blade holders 15 and 16 are provided at their free ends with cutting and stripping blade means 12 and 13 (FIG. 1), and with stripping means 25 and 26, respectively. Adjustable conductor stop means 14 are provided on the lower blade holder for limiting the extent to which an insulated conductor is introduced longitudinally within the open mouth 55 of the tool. Adjustable depth control means 44 are provided in the cutting jaw 8 for controlling the relative position of the associated upper blade holder 16, thereby to control the depth of cut in the insulation layer produced by the cutting and stripping blade 13. Fixed scale 59 provided on the clamping jaw adjacent the depth control means 44 indicates the appropriate setting to be made in accordance with the diameter of the insulated conductor that is to be stripped. Scale S on the shell portion 4 indicates the extent to which the insulated conductor is to be longitudinally introduced into the mouth of the stripping tool. In the following description of the figures, terms such as above, below, left, right, front, behind, etc., refer exclusively to the sample representation and position of the pliers chosen in the respective figures. These terms are not to be understood restrictively, i.e., these relations may change in different working positions or by mirror symmetry design or the like.

Figure 1:
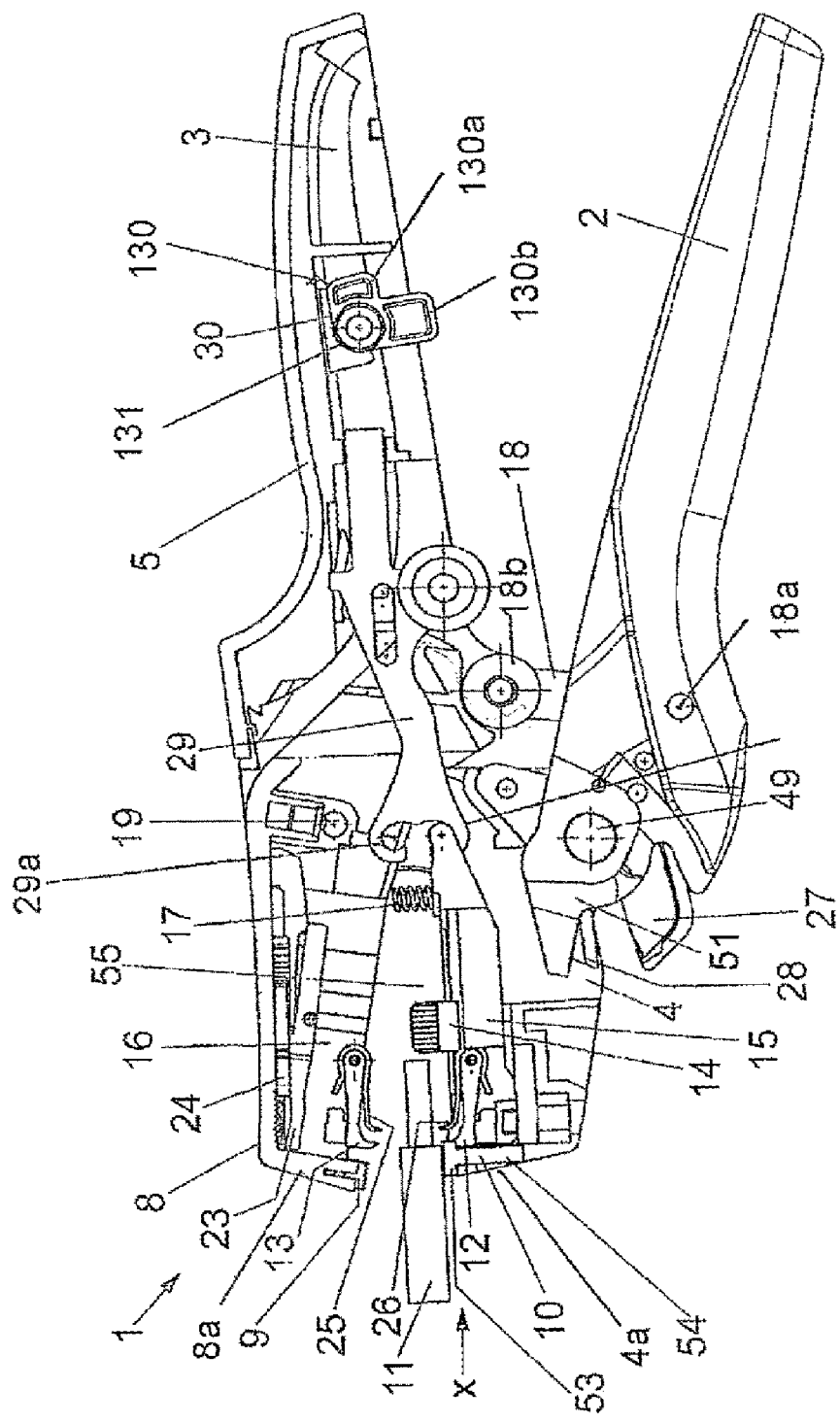
FIGS. 1 and 2 are side elevation views, with certain parts removed, of one embodiment of the stripping pliers of the present invention when in the initial loading and final stripping positions, respectively.
Figure 2:
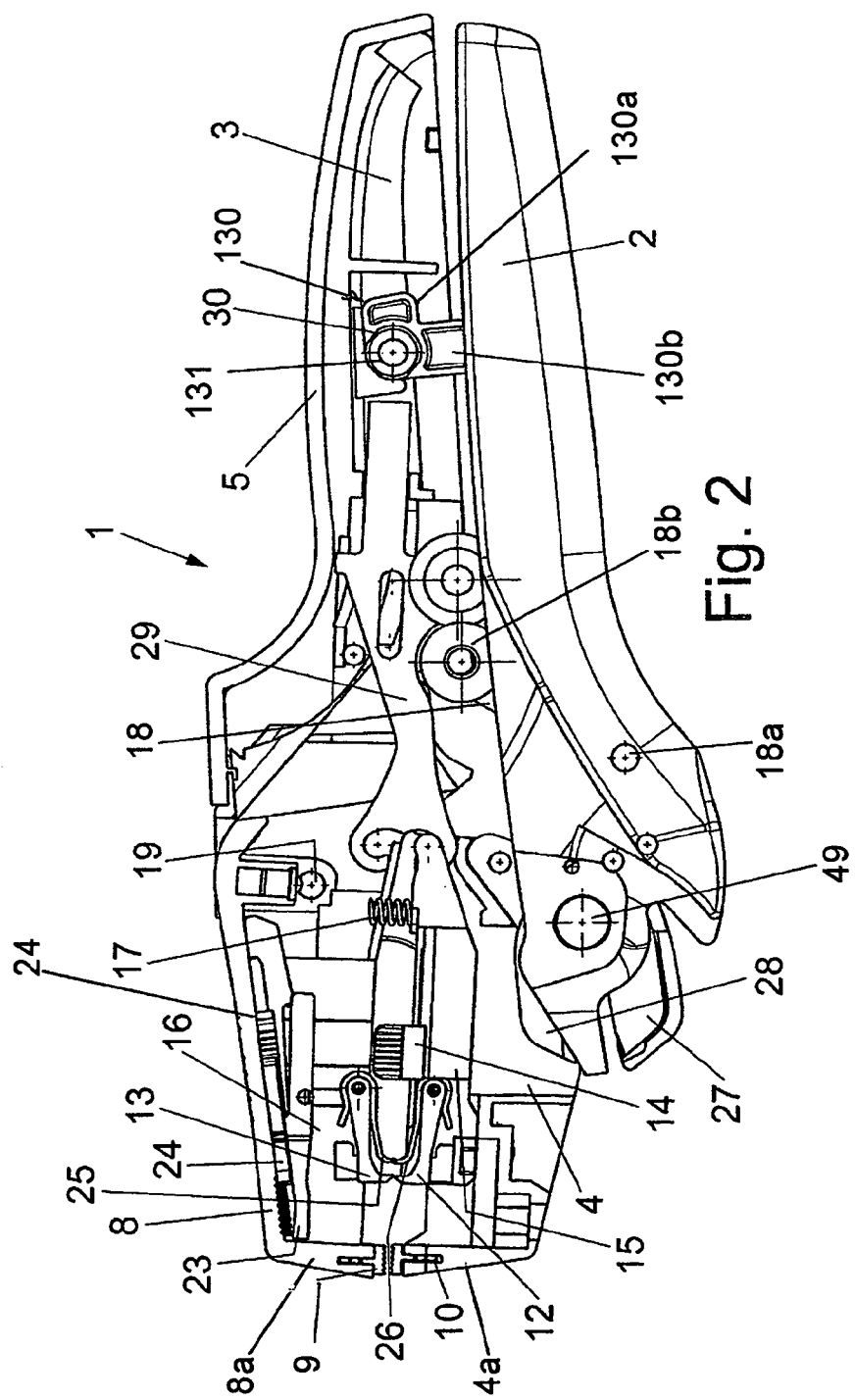

FIGS. 1 and 2 show a stripping pliers 1 with two hand levers 2 and 3. One hand lever 3 is a single piece with a housing shell 4, while the other hand lever 2 can is mounted and can swivel on the housing shell 4.

Figure 3:
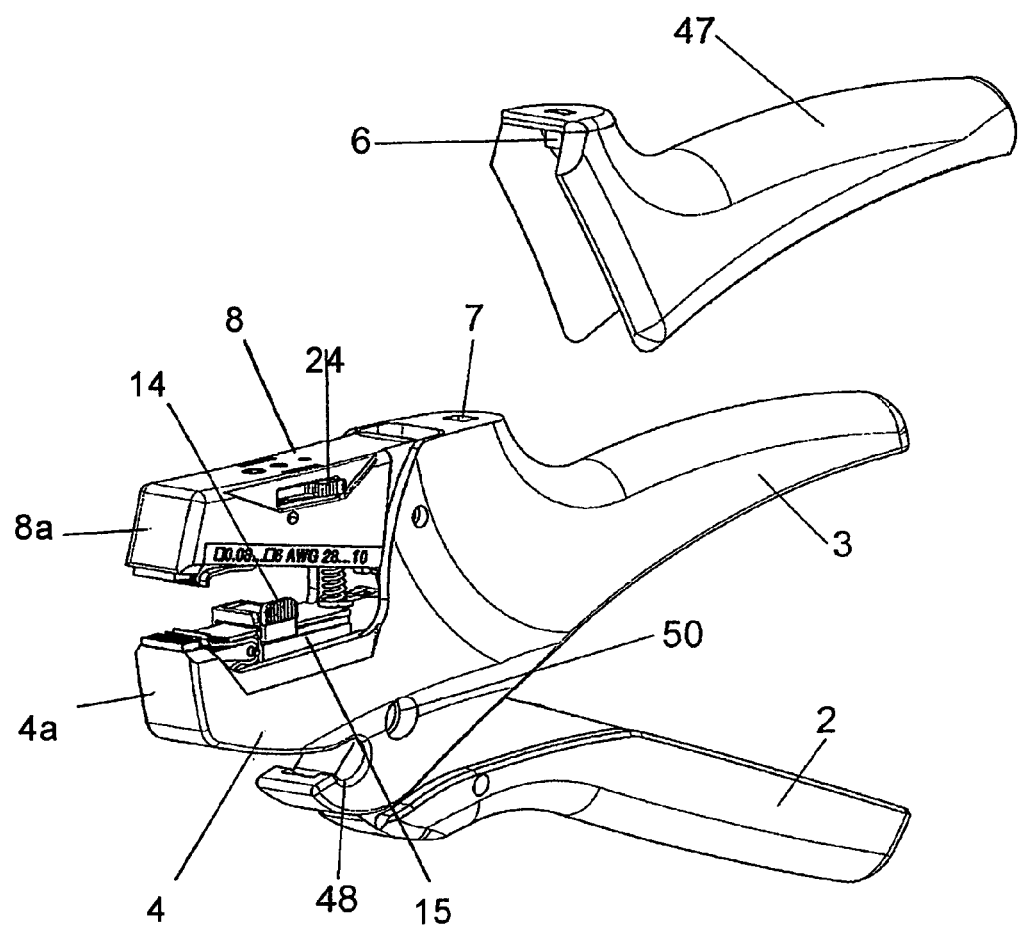
FIG. 3 is an exploded perspective of one embodiment of the stripping pliers with replaceable grip shell member.

A detachable grip shell 5 is pulled onto the hand levers 2, 3 and can be replaced by a larger or smaller grip shell, depending on the size of the user's hand, so that the grip width of the stripping pliers can be modified. FIG. 3 shows, besides one embodiment of the stripping pliers for the hand levers 2 and 3, a replacement grip shell 47 for the upper hand lever 3, which is adapted to the contours of the hand lever 3 and encloses the hand lever 3 on three sides. It would also be conceivable to have a molding adapted to the back of the hand lever as a grip shell replacement, or a U-shaped grip shell, which covers both the back and the side regions of the hand lever 3. As another alternative, one could also consider a replacement grip shell 47 which can be pulled onto the first grip shell 5 to enlarge the grip width, so that the grip shell 5 covering the hand lever remains on the hand lever. Preferably, the grip shell 5 has at least one locking tooth 6, which can engage in a lock opening 7 in the hand lever 3 to provide the grip shell 5 a stable and secure purchase on the hand lever 3.

The pivotable hand lever 2 is mounted movably on the housing shell 4, thanks to a mounting bolt 49, which passes through boreholes 50 in the side walls 51 of the hand lever 2 and in the side walls of the housing shell 4. Part of the side walls 51 of the hand lever 2, especially the part around the boreholes, lies against the inner walls of the housing shell 4. In this way, the hand lever 2 is guided in the housing shell 4. The swiveling hand lever 2 has, at its left end, a cutting appliance with a cutting blade 27, which when the hand lever is swiveled moves toward the other hand lever against a cutting blade 28 arranged on the housing shell 4, so that a cable introduced in this spot can be cut through. The housing shell 4 is preferably shaped as a round mouth 48 in this spot for introducing a cable to be cut.

Figure 25:
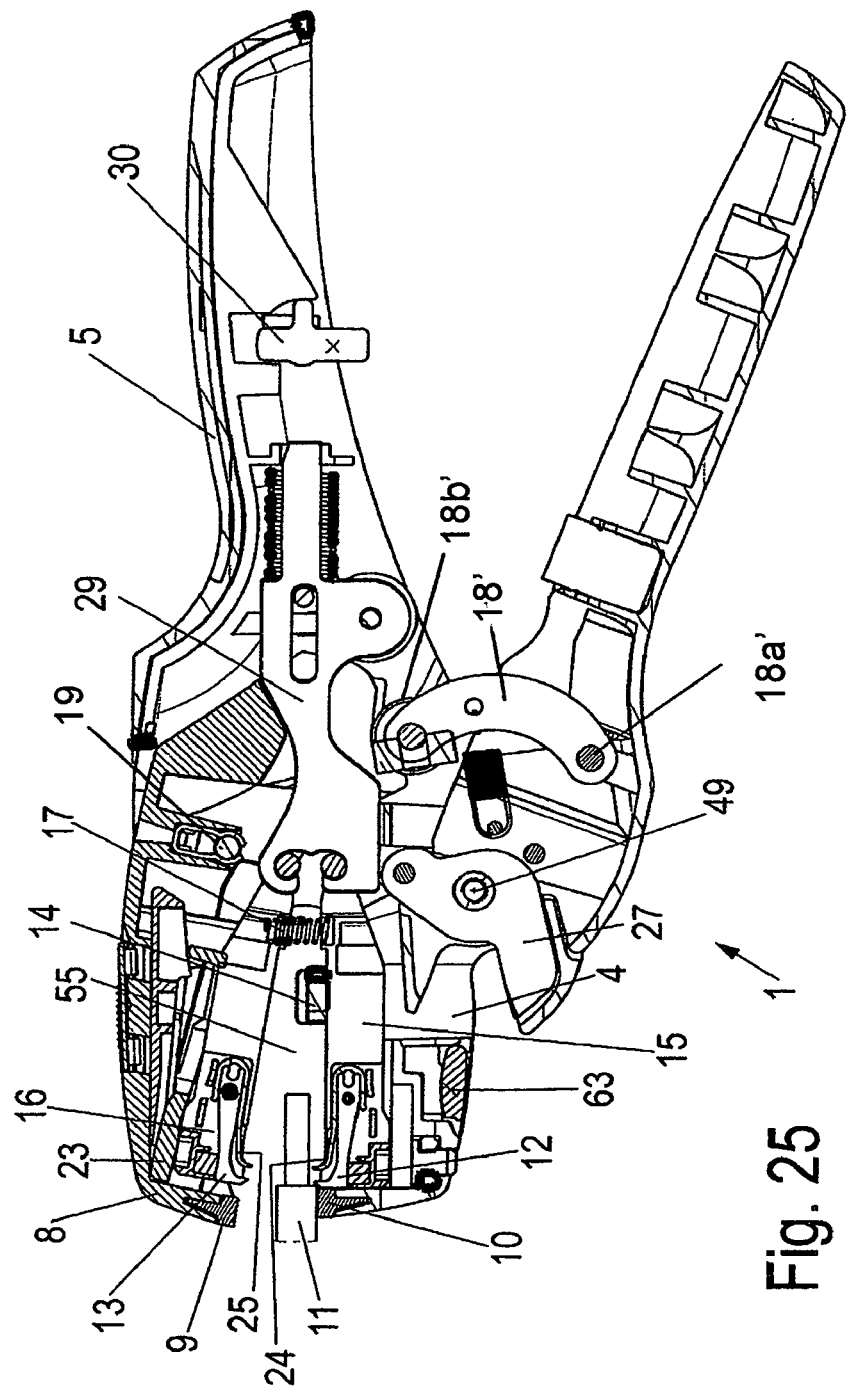
FIG. 25 is a side elevation view of another embodiment of the stripping pliers with certain parts removed.

In a special embodiment shown in FIGS. 25 to 26C, a locking lever 63 is arranged on the housing shell 4 in front of the cutting appliance or the opening of the round mouth 48. This locking lever is arranged on the housing 4, preferably next to the cutting blade 28, at its end facing the cutting appliance by means of a pivot axis 64 in front of the opening of the round mouth 48, and thus can pivot on the housing. To secure the locking lever 63 to the housing 4, the locking lever 63 is configured with a locking cam 65, which sticks out from the locking lever 63 toward the side surface of the housing 4 and can lock inside a recess 67 on the side surface of the housing 4. FIGS. 26B and 26C show the locking lever 63 in a locking position, where the round mouth 48 is blocked by the locking lever 63. The round mouth opening 48 is thus blocked by the locking lever 63, one end face 66 of the locking lever 63 being fixed against the opposite side of the round mouth 48. Alternatively, the pivot axis 64 of the locking lever 63 can also be placed on the opposite side of the round mouth 48. To prevent an unintentional separation or cutting through of an electrical cable which has accidentally gotten into the cutting appliance, the locking lever 63 is rotated from its neutral position close against the housing 4 to the opposite side of the round mouth 48 to block the round mouth 48. This prevents a cable from being placed in the round mouth 48, so that when the swiveling hand lever 2 is activated for a stripping maneuver the two cutting blades 27, 28 will still be moved toward each other, but no cable can be cut through.

A clamping jaw 8 is mounted and can swivel on the housing shell 4, thanks to a mounting bolt 19, which passes through boreholes 20, 21 in the side walls 51 of the clamping jaw 8 and in the housing shell 4. Part of the side walls 51 of the clamping jaw 8, especially the part around the boreholes 20, lies against the inner walls 52 of the housing shell 4. In this way, the clamping jaw 8 is guided in the housing shell 4.

At the forward end wall 4a of the clamping jaw 4 is attached a clamping jaw insert 9, formed of a durable rigid material, such as steel. Opposite this clamping jaw insert 9, especially its pressing piece 53, is secured in the same manner another clamping jaw insert 10 at the tip of the housing shell piece 4, forming a lip of the pliers mouth. The clamping inserts 9 and 10 consist of a sheet-like pressing piece 53 and a pin 54 standing upright on the surface, projecting into the tip of the clamping jaw 8 and being held there by friction or form-fitting. The clamping jaw 8 and the a forward end wall of the housing shell 4, on the left in FIG. 1, 2, together form the mouth 55 of the stripping pliers.

Figure 4:
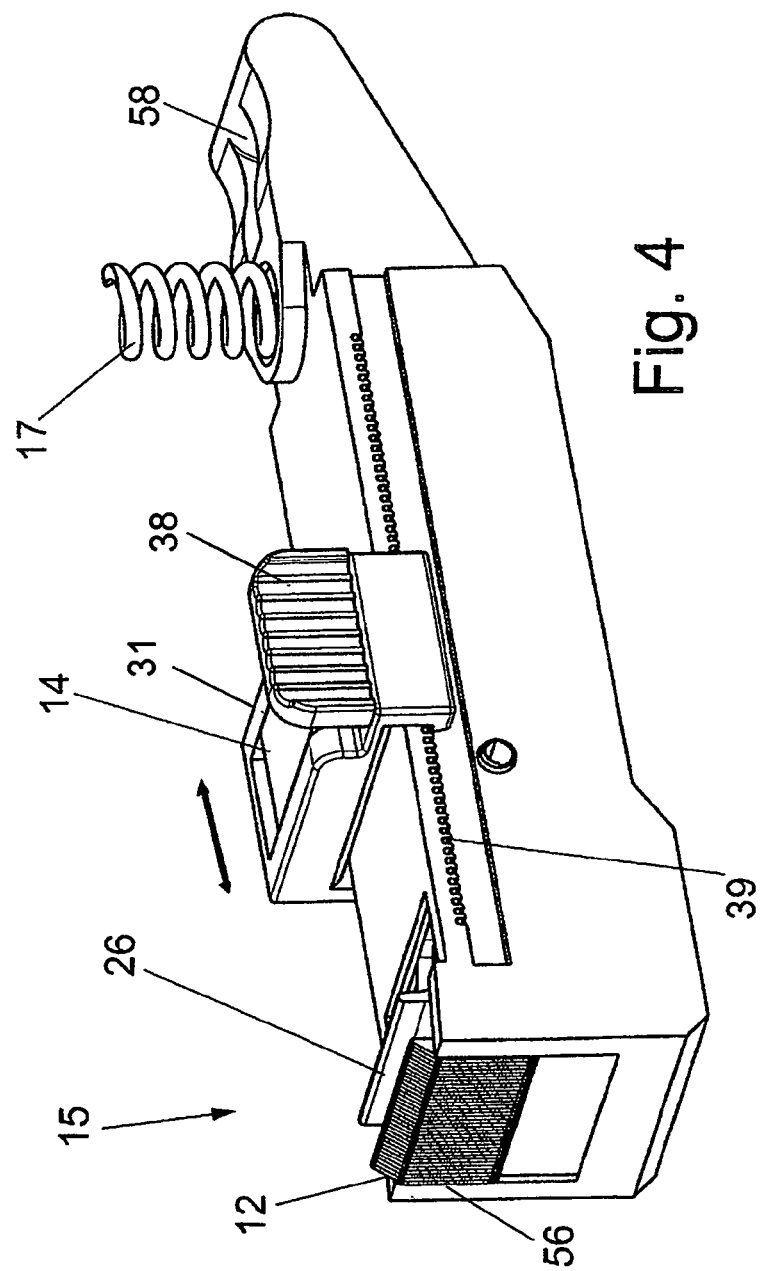
FIG. 4 is a perspective view of the lower blade holder.
Figure 8:
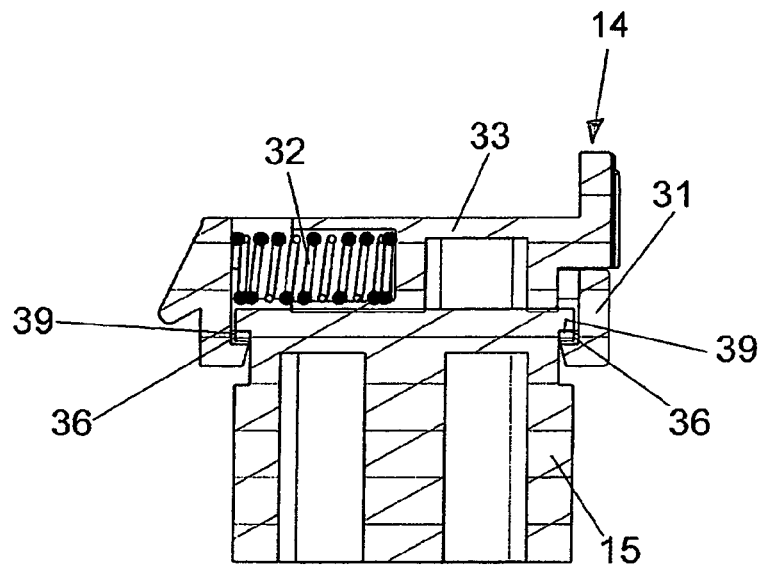
FIGS. 8 and 9 are sectional views illustrating the conductor stop means in the locked and unlocked conditions, respectively.
Figure 9:
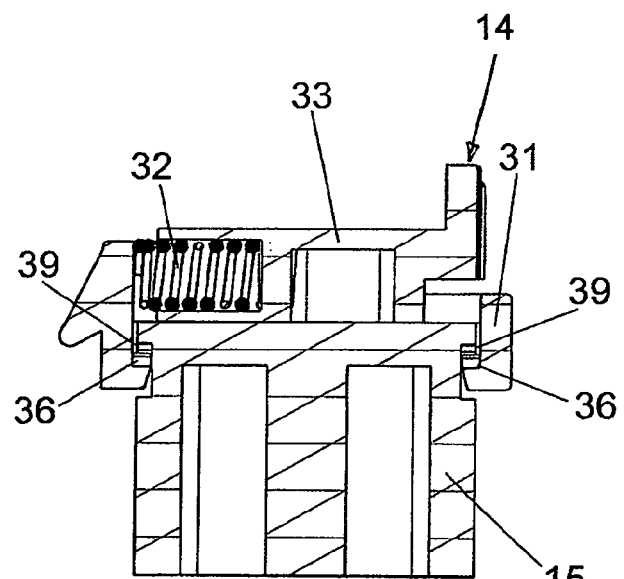
Figure 10:
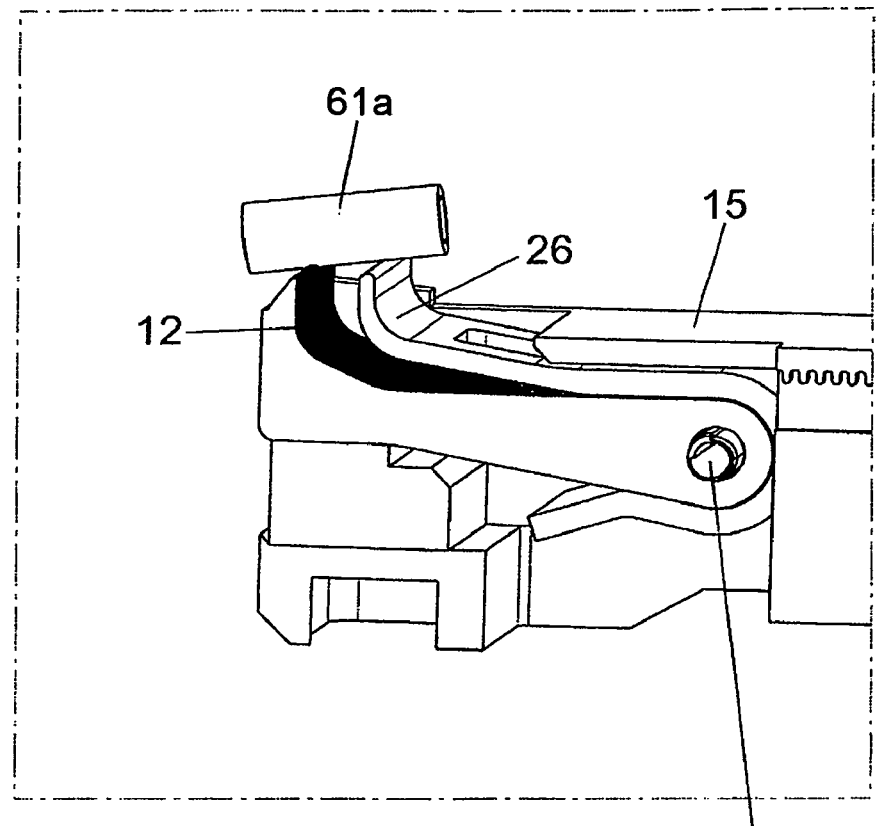
FIG. 10 is a perspective view of an ejector arrangement mounted on the blade holder.
Figure 11:
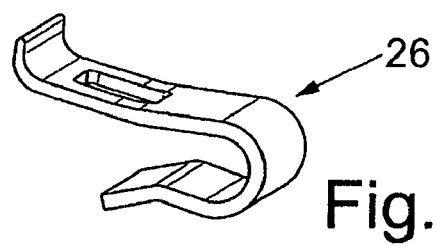
FIG. 11 is a detailed perspective view of the ejector spring of the assembly of FIG. 10.

One blade holder 15 and 16 each is arranged at the bottom of the clamping jaw 8 and the top of the front housing piece 4, behind the clamping jaw inserts 9, 10 in the direction x of insertion of a cable. As can be seen in FIGS. 1 and 4, a stripping blade 12, 13 projects from both blade holders 15, 16 at their front ends. The position of the stripping blades 12, 13 on the blade holders 15, 16 in the cable insert direction x is chosen so that the edges of the blades meet when the pliers is operated. These stripping blades can be designed as massive blades or, as is evident from FIG. 4, preferably as a set of lamellas 56. The advantage of this configuration is a better adapting of the lamellas to the contour of a cable being stripped. Further in the mouth, on one of the blade holders 15, 16, preferably on both of them, is arranged an ejector 25, 26, which prevents insulation scraps from sticking to the stripping blades 12, 13. The lower ejector 25 is shown as an example in FIGS. 10 and 11. It is designed as a spring. Preferably, it has an S-shape, one end making contact with the piece of insulation being ejected and the other end is passed around a bolt 57, on which the stripping blade 12 is also secured per the embodiment shown in FIG. 1.

Further into the mouth, a movable cable stop means 14 is mounted on the lower blade holder 15, located in the housing shell 4, to allow for different stripping lengths. The cable stop 14, as can be seen in FIG. 5-7, is composed of a stop 31, a stop lock element 33 and a compression spring 32. The stop lock element 33 is guided in the stop 31 by slanted oblong holes 34, each of which engages with a protrusion 35 located on the inner lengthwise sides of the stop 31.

The mode of operation of the cable stop 14 is shown in FIG. 5-9. When the cable stop means 14 is activated by pressing on an operating surface 38 on the stop release element 33, the stop release element 33 is pushed laterally relative to the stripping pliers against the compressive force of a compression spring 32 located between the stop member 31 and the opposite end of the stop release element 33, and thanks to the guiding of the stop release element 33 in the stop 31 by the oblong holes 34 and protrusions 35 of the stop 31, it is forced downwardly to disengage a tooth rack arrangement 36 arranged on the stop 31 from a corresponding tooth rack arrangement 39 running along the longitudinal sides of the blade holder 15. The cable stop member 31 can then be moved longitudinally of the blade holder 15. If one then lets go of the operating surface 38 on the stop member 31, the compression spring 32 forces the stop lock element 33 upwardly toward the starting position of the stop. The stop member 31 will be lifted upwardly to cause re-engagement of the tooth rack arrangements 36, 39 of stop 31 and blade holder 15, thereby to again fasten the cable stop 14 on the blade holder 15.

In order to support an exact adjusting of the cable stop for a desired stripping length, a scale S is applied to the housing shell 4 in the area of the blade holder 15, 16 parallel with it. Preferably, the scale consists of millimeter rulings, but other units are also possible, of course. Preferably the scale is placed directly above or below the blade holder 15, 16 on the housing shell 4.

In the pliers mouth 55, a compression spring 17 sits on the lower blade holder 15, pressing against the upper blade holder 16 and counteracting the force exerted by the user on the pliers mouth 55, and opening the pliers mouth 55 once again when the hand levers 2, 3 are let go.

The blade holders 15, 16 are removably hooked into a double-hook arrangement 29a, 29b at the end of a pull rod 29. This double-hook arrangement has the profile of the number "3" and open toward the blade holders, whose ends engage in an opening 58 provided for this purpose in the end pieces of the blade holders and securely hold the blade holders in this way, so that when the pull rod moves horizontally the blade holders move along with it. In the front region, the blade holders 15, 16 are guided by the inner sides of the front piece of the housing shell 4 and the inner sides of the clamping jaw.

To replace the blade holders 15, 16, one must first remove the pivot pin 19, securing the clamping jaw 8, from the bearing position 46 and the clamping jaw 8 from the housing shell, as shown in FIG. 20-23. Then one swings the upper blade holder 16 upward to take it out from the upper fork of the pliers mouth. Once the upper blade holder 16 has been removed, the lower blade holder 15 lying in the housing shell can be easily swung upward and taken out of the lower fork of the pull rod mouth. The blade holders can then be replaced by new ones or the same ones with a different blade shape.

The pull rod 29 runs essentially horizontally through the inside of the stripping pliers. It is mounted so that it can move horizontally. At its end pointing toward the pliers mouth is found the already mentioned mouth in the double-hook profile of an open numeral "3", in which the blade holders are pivotally hooked to the pull rod.

Figure 12:
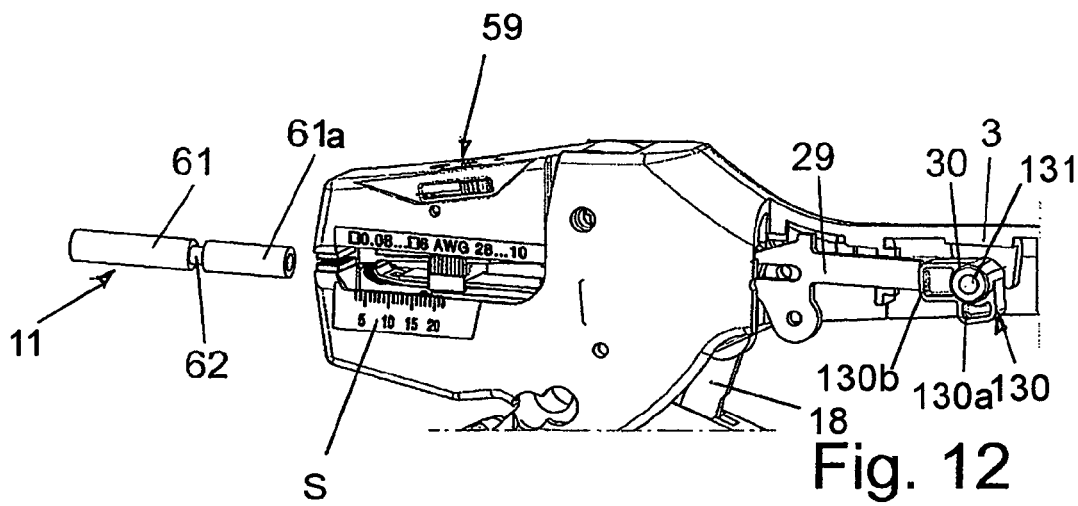
FIG. 12 is a perspective detail view of one embodiment of the stripping pliers provided with pull rod partial stripping stop means.
Figure 13:
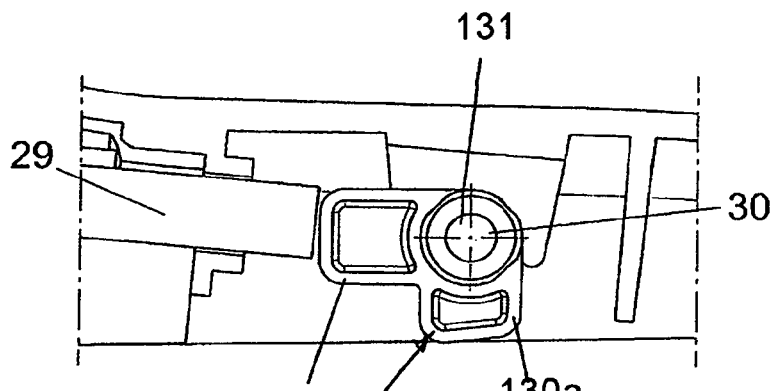
FIGS. 13 and 14 are detailed views of the partial stripping stop means when in the partial stripping and full stripping released conditions, respectively.
Figure 14:
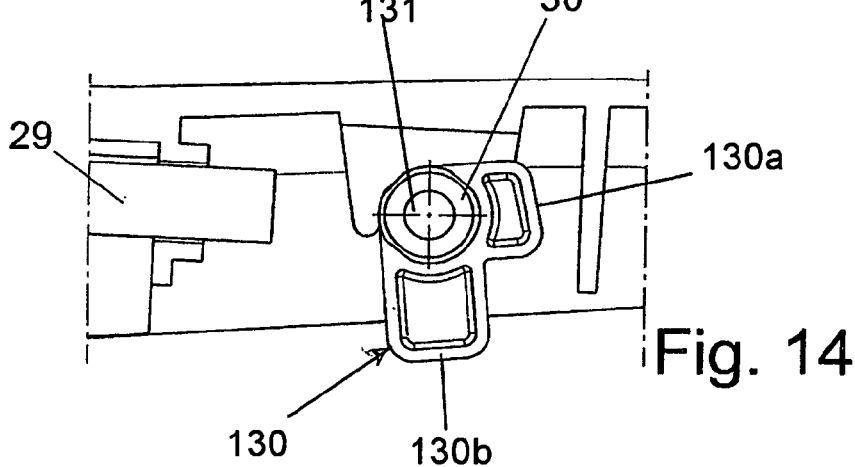

In one embodiment of the stripping pliers, a partial stripping stop means 30 is fastened in the hand lever 3 behind the end of the pull rod away from the blade holders (15, 16). A detail view of the partial stripping stop means 30 is shown in FIGS. 12-14. This allows for a partial stripping 62 of an insulated piece of wire 61. It is preferably configured as an L-shaped piece 130 that is pivotable about pivot axis 131 and includes arms 130a and 130b of different lengths. The mounting of the partial stripping stop means 30 is situated in the junction between the arms of the L-bend, so that the partial stripping stop means 30 can be optionally adjusted so that the pull rod 29 is limited in its backward movement by the longer leg 130b of the L-piece 130, and thus a full stripping of the wire piece is prevented. In the other adjustment possibility shown, the partial stripping stop 130 is rotated away from the path of the pull rod 29 so that the latter can move freely.

In another embodiment shown in FIGS. 15-17, the freedom of movement of the pull rod 29 is limited by an adjusting cam 40. This adjusting cam 40 is mounted and can pivot above the hand lever 2 at the right next to the operating lever 18, which also controls the movement of the pull rod 29. In the partial stripping position shown in FIG. 16, the adjusting wheel 40 limits the operating lever 18 such that the pull rod 29 and thus also the blade holders 15, 16 execute only a limited travel. The adjustment for full stripping is shown in FIG. 17. Here, the adjusting wheel is fixed by a cam strip 41 present underneath the adjusting wheel and faces away from the operating lever, so that it has more freedom of motion and thus the pull lever 29 and the blade holders 15, 16 can travel the full distance.

Figure 27:
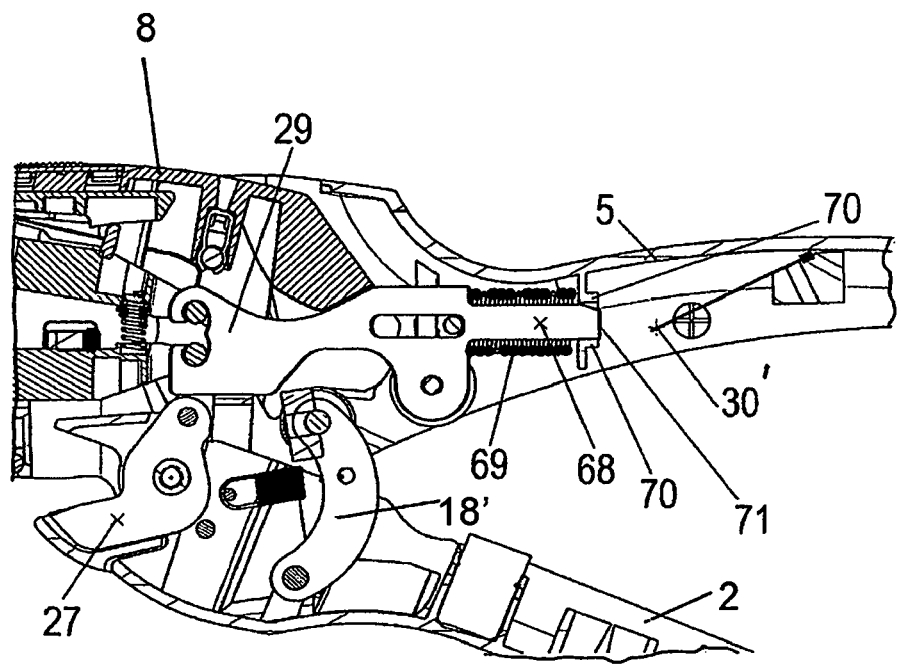
FIG. 27 is a detailed side elevation view of the embodiment of the stripping pliers shown in FIG. 25 provided with another embodiment of the partial stripping stop means.
Figure 28:
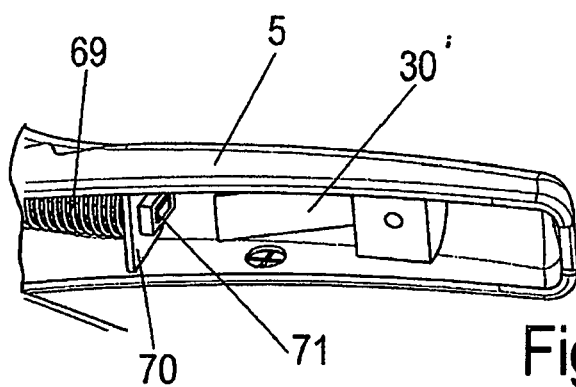
FIG. 28 is a perspective detailed bottom view of the stop means of FIG. 27.

In another embodiment shown in FIGS. 27 and 28, the freedom of movement of the pull rod 29 is limited by a partial stripping stop means 30' fashioned as a leaf spring. As can be seen in the detail view of this partial stripping stop 30' in FIG. 28, this is likewise freely secured in the hand lever. The leaf spring 30' is freely secured in the hand lever by a rear end, facing the end of the pliers. The front end of the leaf spring points in the direction of an end 71 of the pull rod, which is pushed through an opening in a stop 70, which is arranged in the hand lever 3. Preferably, the rear segment of the pull rod is grasped by a spring element 69, which counteracts a stripping movement of the pull rod in the direction of the end of the pliers in that the one end of the spring element 69 rests against the stop 70 and with its other end it is compressed by the movement of the pull rod in the direction of the stop. In this way, when the pliers is squeezed, after traveling a distance X the pull rod 29 hits the partial stripping stop 1, which indicates that the partial stripping process is finished. In order to perform a full stripping, the pull rod 29 has to be forced further against the leaf spring 30, so that it is deflected.

Figure 29:
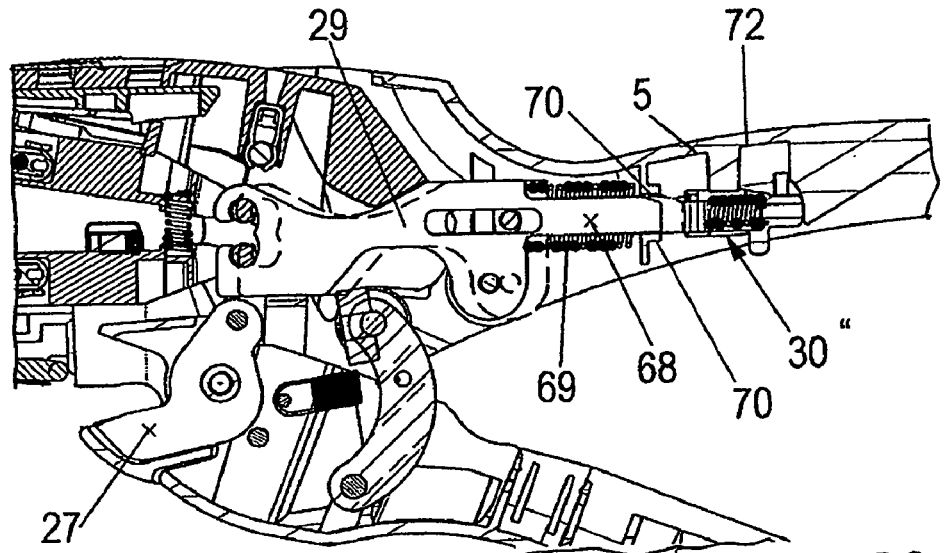
FIG. 29 is a detailed side view, with certain parts removed, of a further type of stop means.
Figure 30:
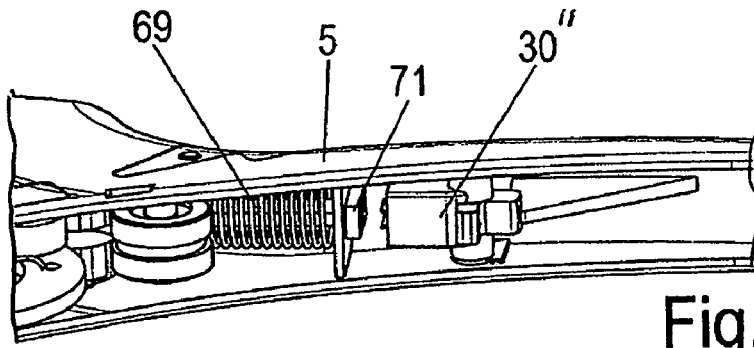
FIGS. 30 and 31 are detailed perspective views of the stop means of FIG. 29.
Figure 31:
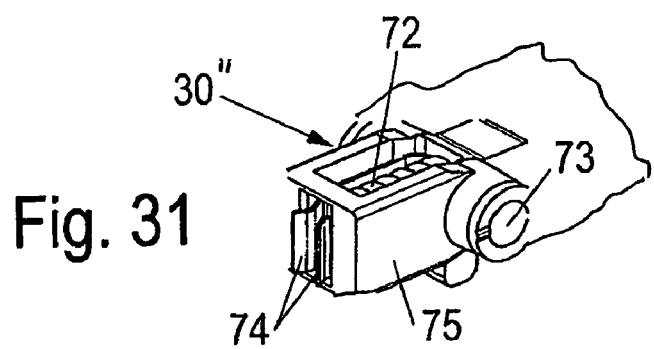

According to a further embodiment, the freedom of movement of the pull rod 29 is limited by a partial stripping stop 30" which, as shown in FIGS. 29 to 31, is fastened and can rotate by a pivot axis 73 in the hand lever 3. Furthermore, the partial stripping stop 30" has a housing 75, in which a dampening element 72 is mounted, which sticks out from the housing at one end face 74 and impinges on the pull rod 29 as it is pushed backward during a partial stripping process.

Figure 32:
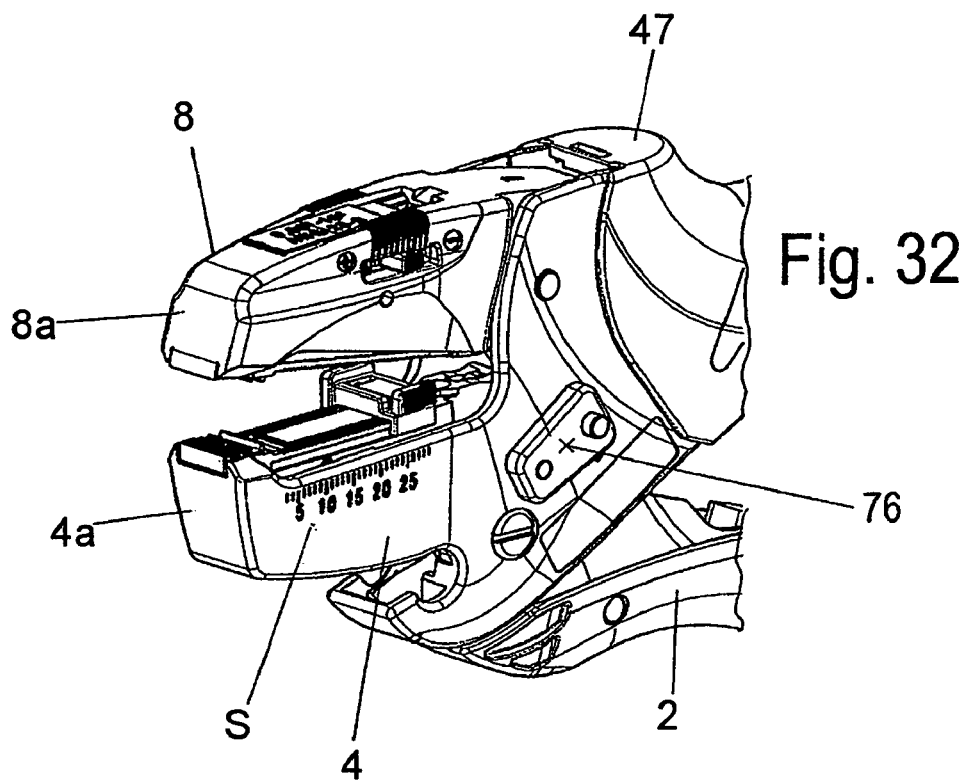
FIGS. 32 and 33 are detailed perspective views of and alternate embodiment of the pull rod stop means.
Figure 33:
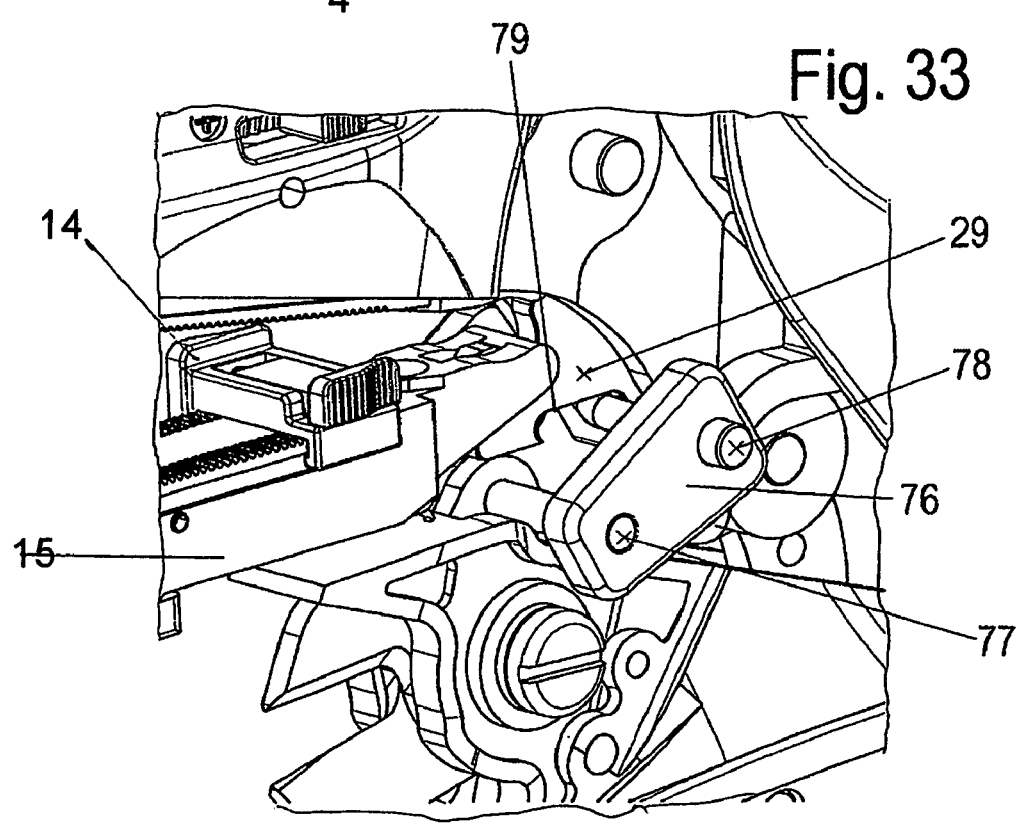

In another embodiment shown in FIGS. 32 and 33, the pull rod 29 has a recess 79, in which a bolt 78 spring-loaded in a housing 76 engages. The housing 76 is secured by a pin 77 to the housing 4 of the stripping pliers. In this way, by pressing the bolt 78 into the recess 79 the freedom of movement of the pull rod 29 in the direction of the lengthwise axis of the pull rod is limited to the length of the recess 79. This ensures that the electrical cable is only partly stripped, that is, the insulation is cut through, but the piece of insulation remains on the cable.

Figure 18:
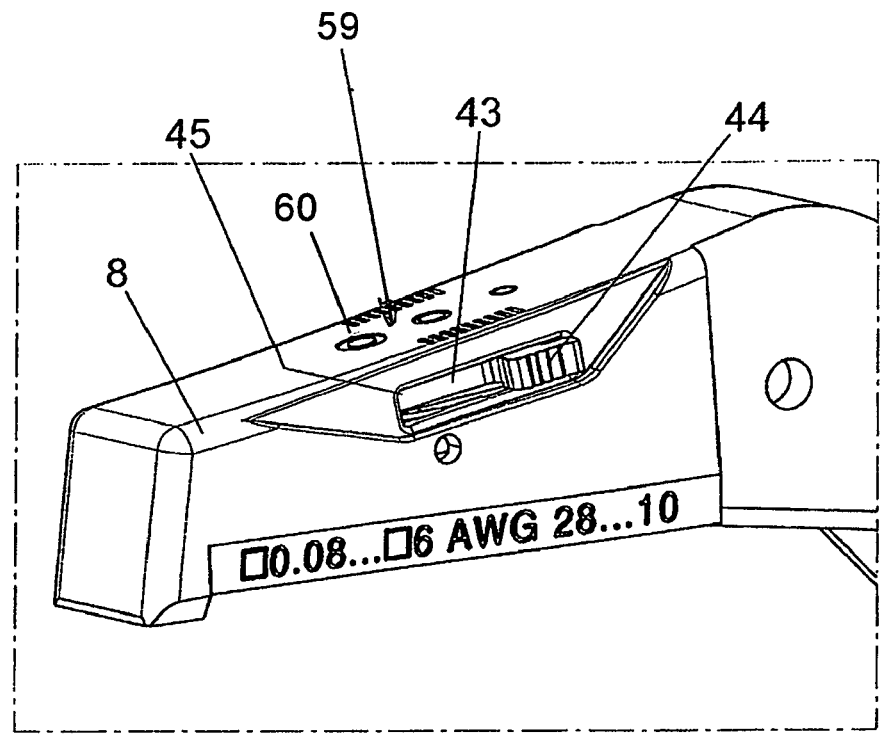
FIG. 18 is a perspective detail view of a clamping jaw provided with cutting depth adjustment means.
Figure 19:
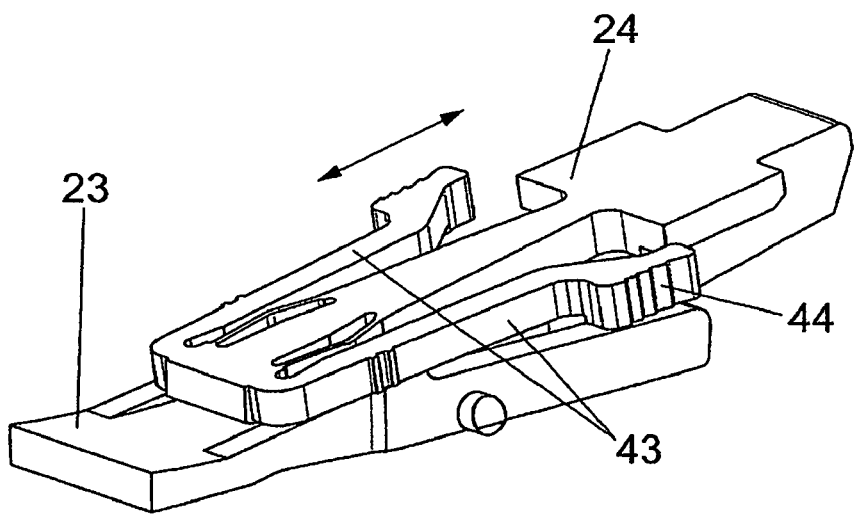
FIG. 19 is a detailed perspective view of the adjusting slide device of FIG. 18.

As can be seen in FIGS. 1 and 18, an adjusting slide 24 for changing the height of the blade holder is arranged above the blade holder 16 in the clamping jaw 8. As shown in FIG. 19, this slides on a slide plate 23. The adjusting slide 24 has on either side a flexible leg 43 with corrugated outer contact surfaces 44 at the ends, which stick out through openings 45 in the side surfaces of the clamping jaw 8 and can be pressed in by the user in order to move the adjusting slide along the lengthwise axis of the clamping jaw. The adjusting slide 24 is flat in its front region and increases in thickness toward the rear. The flexible legs of the adjusting slide merge at the front end with the main body of the adjusting slide and spread away from it toward the other end. The main body of the adjusting slide 24 tapers in its width backward in the region of the legs, to allow the legs to be pressed against the main body. The rear region of the adjusting slide 24 has the same width as the slide plate 23 located underneath, only the end piece being somewhat more narrow. If one moves the adjusting slide 24 forward, i.e., to the left in the figure, the slide plate and thus also the blade holder 16 resting against it will be forced downward. This enables a fine tuning of the cutting depth for the wire being stripped, so that one can also make precision cuts in the insulation layers of cables with insulation layers of different diameter. To indicate the direction in which the adjusting slide needs to be moved for an insulation layer with a given diameter, a scale 59 and several ring symbols 60 of progressively larger radius are placed on the clamping jaw 8, preferably on the back of the clamping jaw 8.

When using the stripping pliers, as the two hand levers 2, 3 are squeezed together by one hand, the hand lever 2 is forced in the direction of hand lever 3. The clamping jaw 8 is at first forced downward against the housing shell 4 by a lever mechanism including the operating lever 18 pivotally connected at one end 18*a* with the handle member 2 (FIG. 15) and carrying at it other end a roller 18*b* that engages a corresponding cam surface 8*b* (FIG. 20) on the clamping jaw 8. This clamps down on a piece of cable 11 placed in the pliers. At the same time, the stripping blades 12, 13 of the blade holders 15, 16 cut into the jacket of the piece of cable 12. If one continues to squeeze the pliers, the pull rod and the blade holders 15 and 16 pivotally connected thereto will be pulled backward by the lever mechanism, thus pulling the severed insulation layer of the conductor backward from the bare conductor wire. Depending on the position of the partial stripping stop 30, the insulation will be entirely or only partly pulled off from the piece of cable. The ejector spring 26 will be placed under tension. As soon as the user lets go of the pliers handle members 2 and 3 and removes the insulated conductor or cable from the pliers, the clamping jaw 8 will be pushed back into the open position by the compression spring 17, and the ejector spring will relax and discharge the stripped piece of insulation from the mouth of the pliers.

While in accordance with the provisions of the Patent Statutes the preferred forms and embodiments of the invention have been illustrated and described, it will be apparent to those skilled in the art that changes may be made without deviating from the invention described above.

What is claimed is:

1. Insulation-stripping pliers apparatus (1) for stripping a layer of insulation from an insulated conductor (10), comprising:
   (a) a pair of handle members (2, 3) having first ends that are pivotally connected together for pivotal movement about a horizontal main pivot axis (49), said first end of one of said handle members comprising a hollow shell portion (4) having a pair of parallel spaced vertical side walls (52), and a vertical end wall (4*a*) connected between the free ends of said side walls, said handle members being relatively pivotally displaceable between open and closed positions, respectively, said side and end walls defining a chamber within said shell portion;
   (b) a clamping jaw (8) arranged in said shell chamber for pivotal displacement about a pivot axis (19) that is parallel with said main pivot axis, said clamping jaw being pivotable between released and clamping positions relative to said shell portion, said clamping jaw having a first end portion (8*a*) that is adjacent said shell portion end wall when said clamping jaw is in said clamping position;
   (c) a pair of generally rectangular blade holders (15, 16) arranged in superposed relation in said shell chamber in a vertical plane normal to said main pivot axis, said blade holders having first ends remote from said shell end wall that are pivotally connected together, and second ends adjacent said shell portion end wall, said second blade holder ends carrying opposed cutting and stripping blades (12, 13), said blade holders being relatively pivotally displaceable between closed and open positions;
   (d) biasing means (17) for biasing said handle members and said blade holders toward their open positions, said blade holders in said open position defining therebetween a mouth opening (55) for receiving one end of a longitudinally-inserted insulated conductor;
   (e) a pull rod mechanism for displacing said blade holders, when in said closed position, longitudinally between positions adjacent and remote from said shell end wall, respectively, said pull rod mechanism including a pull rod (29) mounted for longitudinal displacement relative to one of said handle members;
   (f) operating means (18) operable when the end of an insulated conductor is inserted longitudinally into said mouth opening and said handle members are pivoted from said open position toward said closed position for:
     (1) initially pivoting said clamping jaw toward said clamping position, thereby to clamp the insulated conductor against said shell end wall, and for pivoting said blade holders to effect cutting engagement of said blades with, and severing of, the conductor insulation layer; and (2) subsequently displacing said pull rod toward said remote position, thereby to strip the severed insulation layer from the conductor; and (g) a pull rod stop mechanism for limiting the longitudinal displacement of said pull rod to an intermediate position between said adjacent and said remote positions, whereby the portion of the insulation layer severed from said insulated conductor is only partially removed from the insulated conductor, said pull rod stop mechanism including a stop member (30) pivotally connected with said one handle member, said stop member having a generally L-shaped configuration including a pair of orthogonally arranged leg portions (130a, 130b) having different lengths, said stop member being pivotable about a pivot axis (131) that is normal to the plane containing said stop member leg portions and that extends through the juncture between said leg portions, said stop member being pivotable between different positions for varying the distance between said pull rod adjacent position and said intermediate position.

2. Insulation-stripping pliers apparatus as defined in claim 1, wherein said operating means includes an operating lever (18) that is pivotally connected with one of said handle members; and further wherein said pull rod stop mechanism comprises a cam (40) that is pivotally connected with one of said handle members to restrict the extent of displacement of said operating lever.

3. Insulation-stripping pliers apparatus as defined in claim 2, and further including detent means (41) mounted on said handle member for controlling the angular position of said cam relative to the associated handle member.

4. Insulation-stripping pliers apparatus as defined in claim 1, wherein said pull rod stop mechanism comprises a leaf spring (30') connected at one end with one of said handle members, the other end of said leaf spring being arranged in the path of longitudinal displacement of said pull rod.

5. Insulation-stripping pliers apparatus as defined in claim 1, wherein said pull rod stop mechanism comprises a dampening element (72) connected for pivotal displacement between operable and inoperable positions relative to the path of longitudinal displacement of said pull rod mechanism.

6. Insulation-stripping pliers apparatus as defined in claim 1, wherein said pull rod comprises a longitudinal recess (79); and further wherein said pull rod stop mechanism includes a stop housing (76) carrying a stop bar (78), said housing being pivotally connected with one of said handle members between operable and inoperable positions in which said stop bar extends into and out of said stop recess, respectively.

7. Insulation-stripping pliers apparatus as defined in claim 1, and further including:

(h) a conductor limiting mechanism (14) mounted on at least one of said blade holder members for limiting the extent to which one end of the insulated conductor may be inserted into said mouth opening, said conductor limiting mechanism including:

(1) a conductor stop member (31) arranged for sliding adjustment longitudinally of one of said blade holders (15); and (2) locking means (36, 39) for locking said stop member in a selected one of a plurality of positions longitudinally of said one blade holder.

\* \* \* \* \*